May 30, 1944.   H. SCHELLER   2,350,068

FOCUS DRAWING SCALE

Filed Aug. 16, 1943

INVENTOR.
Henry Scheller
BY Henry J. E. Metzler
Agt.

Patented May 30, 1944

2,350,068

UNITED STATES PATENT OFFICE 2,350,068

FOCUS DRAWING SCALE

Henry Scheller, New York, N. Y.

Application August 16, 1943, Serial No. 498,752

2 Claims. (Cl. 35—26)

This invention relates to improvements in drawing devices and more specifically to a new and improved focus drawing scale adapted to facilitate drawing in the perspective.

To learn how to draw in the perspective, free hand representation of objects as they appear to the eye, is an important factor in the education of the child. Drawing in the perspective is the best medium to improve the child's power of observation. When drawing, the intense study of the subject, the focusing of each line, the measuring and comparing of lines with each other, are the best means to train the child to observe better. It is the study of the subject rather than the drawing of the lines, that tend to improve the child's power of observation.

The main object of the present invention is, therefore, the provision of a focus drawing scale which facilitates the correct study of subjects to be drawn in the perspective, thus guiding the child's natural impulse to investigate into a logical endeavour.

Another object of the present invention is the provision of a focus drawing scale which is furnished with a corrector so that the child can correct the work accomplished, rooting the child's belief in its own ability and strengthening his desire for further efforts and progress.

Figures 5 to 17 inclusive are diagrams illustrating the various uses of the device; these diagrams will be explained in detail hereinafter.

Similar numerals refer to similar parts throughout the several views.

Figure 1:
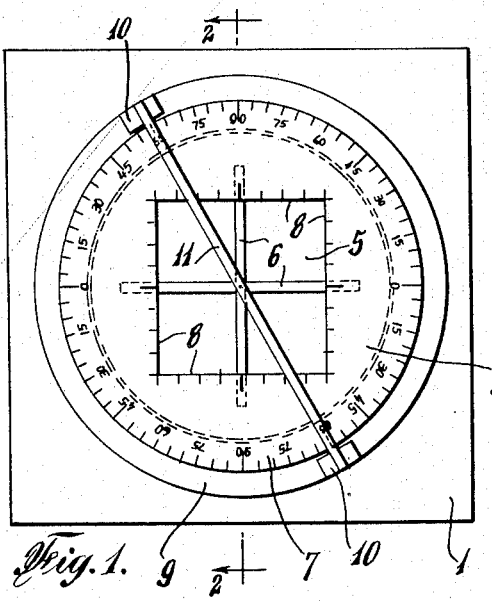
Figure 1 is a top plan view of a preferred embodiment of the invention.
Figures 2, 3:
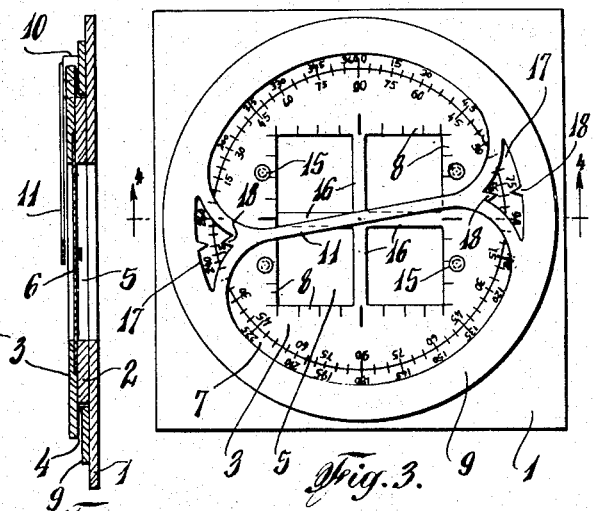
Fig. 2 is a sectional view on the line 2—2 of Fig. 1.
Fig. 3 is a top plan view of a modification of the focus drawing scale.
Figures 5, 6:
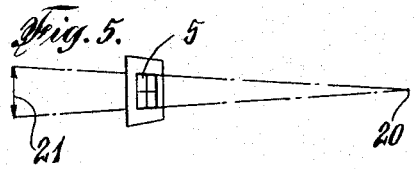

Referring first to Figs. 1 and 2, the numeral 1 designates a base line of cardboard or the like to which a circular plate 2 of Fig. 2 of the same or of a similar material is secured by means of gluing or in any other suitable manner. A disk 3, the diameter of which is larger than the diameter of the circular plate 2, is coaxially secured to plate 2 in such a manner that the disk 3 and the plates 1 and 2 form an annular groove 4 (Fig. 2). The disk 3 and the plates 1 and 2 are provided with centrally located square-shaped perforations which register with each other, thus forming a window or aperture 5. Center strips 6, connecting the centers of each two opposite sides of the square-shaped aperture 5 to each other and crossing each other in the center point of disk 3, divide the aperture 5 into four square parts of equal size. A graduated angle meter dial 7 is on the upper side of disk 3, adjacent to its circular edge, and the edges of aperture 5 are provided with a graduation 8, as may be seen in Fig. 1. A ring 9, engaging the annular groove 4, is adapted to be rotated relative to disk 3. Segments 10, which are secured to ring 9, carry a strip 11 extending centrally over disk 3 so that the half-way point of strip 11 coincides in all positions with the center point of disk 3.

Figures 4, 7:
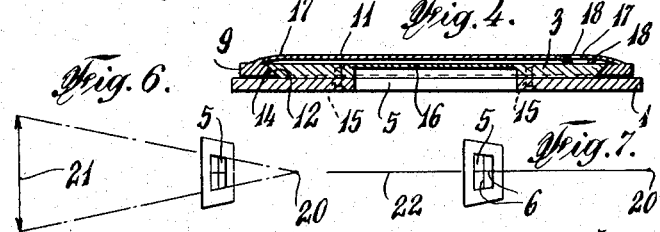
Fig. 4 is a sectional view on the line 4—4 of Fig. 3.
Figure 8:
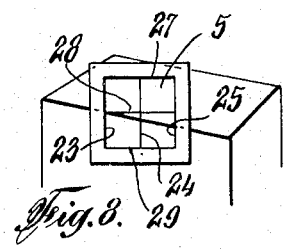
Figure 9:
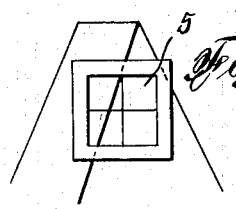

Whereas the embodiment of the invention illustrated in Figs. 1 and 2 is designed to be manufactured primarily of cardboard or the like, the modification shown in Figs. 3 and 4 is designed to be made of plastic material, metal or similar material. According to this modification, to the base plate 1 is secured by means of rivets 15 or the like, a disk 3 having an inwardly inclined circular edge 12 which engages the inclined inner edge 14 of ring 9, as may be seen in Fig. 4.

This member 3 is used instead of a guide made up of the two parts 2 and 3 of Fig. 1, thereby simplifying the structure. The center strips which divide the aperture 5 into four square shaped parts of equal size can be substituted by a cross-piece 16 which forms a unit with disk 3. According to this modification, I prefer to make the strip 11 as a unit with the ring 9 and to increase its width at both ends as shown in Fig. 3, so as to have space enough for perforations or windows 17, through which the dial 7 can be seen. The windows 17 can be provided with pointed parts 18, which are in alignment with the middle axis of strips 11 and which are adapted to facilitate the angular adjustment of ring 9 on the dial 7. The dial 7 is preferably graduated from 0° to 90° and an additional graduation of 0 to 360° can be provided in the dial 7 as shown in Fig. 3.

The device is to be used in the following manner:

Before drawing a scene or object, one frames that part of the subject which one wishes to illustrate, by looking at the subject through aperture 5. As indicated in the diagrams Figs. 5 and 6, in which the numeral 20 designates the eye, and the numeral 21 the size of the subject, one gets more of the subject in the aperture of the focus drawing scale by holding the device closer to the eye (Fig. 6), than if one holds it further away from the eye. (The device should always be held in an exact upright, right angle position, and when focusing, only one eye should be used for sharp one-point vision.) When the subject has been focused satisfactorily, the four squares into which the aperture 5 is subdivided, will indicate the position of the different parts for spacing and placing them on the drawing.

An important feature of drawing in the perspective is the finding of the eye-line 22 (Fig. 7). This means the establishing of an imaginary line which runs across the scene to be drawn in the exact height of the eye. This line cuts the scene in two parts, an upper and a lower part.

Rays in the upper part have to come downwards to reach the eye, while rays from the lower part have to come upwards to reach the eye. To get the exact eyeline of the subject, one places the focus drawing scale in front of the eye, in a right angular upright position, looks straight through aperture 5 so that the point at which the center strips 6 cross each other will be the same height as the eye. The points at which the strips 6 cross each other will then indicate exactly the eyeline or line of vision 22.

Before drawing a line, one focuses its direction using thereto the three vertical lines 23, 24 and 25 and the three horizontal lines 27, 28 and 29 (Figs. 8 and 9), which are represented by the edges of aperture 5 and by the center strips 6. Looking through the aperture 5, one compares the line to be drawn with the nearest of the three horizontal or vertical lines represented by or in aperture 5.

Having focused a line and having established the correct direction, one has to measure and compare the line with lines already drawn, or lines near to it.

When measuring lines, one should try to measure as many lines together as possible.

One moves the focus drawing scale back and forth until the largest line fills the full length of the aperture 5. The larger line then is a unit while the smaller lines will be the fraction thereof. This way it is possible to measure two lines or more at the same time. The edges of the aperture 5 have a graduated scale 8 which will give at a glance the fractions.

Figure 10:
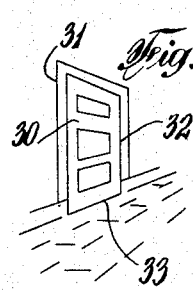
Figure 11:
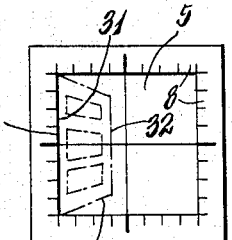

When objects are very small, one uses one of the four squares instead of the whole aperture 5 for measuring and comparing. In Fig. 10, a door 30 is shown as it appears to the eye, and Fig. 11, the door is indicated in dash-and-dotted lines 32 and 33. There it can be seen that, in this instance, the long line 31 registers with the entire vertical side 23 of aperture 5, whereas the length of the sides 32 and 33 of the door appear only as fractions of the edges of aperture 5.

Figures 12, 13:

When measuring a circle, as for instance the opening of the cup 40 shown in Fig. 12, one focuses one of the center strips 6 of the aperture 5 across the center of the circle and moves the focus drawing scale back and forth until the whole width of the circle fills the full length of the aperture 5. Then one can compare the breadth of the circle with the depth. One also has two halves, one half nearer to the eye and the other farther away and their difference in size, as indicated in dash-and-dotted lines in Fig. 13.

Figure 14:
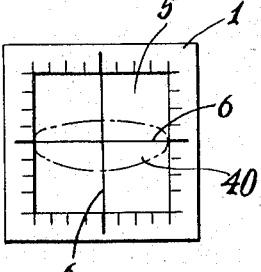
Figure 15:
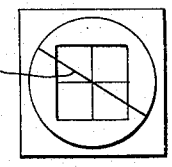
Figure 16:
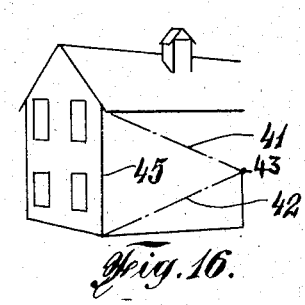
Figure 17:
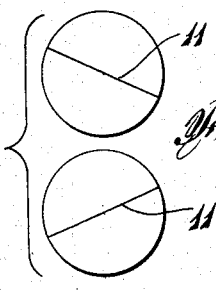

If, after one has drawn a line and wants to make sure of its right position, one can use the degree indicator (strip 11) as a corrector to make certain. For this purpose, the focus drawing scale is to be held so that one of the cross strips 6 (or one of the cross-pieces 16) is in a vertical and the other in a horizontal position and moves the strip 11 even with the line one wants to correct. One brings the focus drawing scale down on the drawing also in a right angle position and compares with the line drawn. Then one can see whether the line is correct or how much it is out of the way. For instance, if Fig. 14 represents a line 50 to be checked, the strip 11 must be in the position shown in Fig. 15.

One can also use the strip 11 as a finder. If one has drawn one line, corrected and established its right position, one can use this line as a base to get the exact position of any point or line on the drawing. To get the exact position of such a point or line, one focuses two lines from each end of the line one is using as a base to the point one wants to find and the crossing of the two focused lines on the drawing will give the exact position of the point one wants to establish. For instance, if in Fig. 16 the line 45 is used as base line, one focuses first the line 41 by bringing the strip 11 in the position shown in the upper circle of Fig. 17; then one focuses the line 42 (Fig. 16) by bringing the strip 11 in the position shown in the lower circle of Fig. 17; the point 43 at which the line 41 crosses the line 42, indicates then the location of the point to be found.

If one does not have a line to use as a base, one can use two established points to focus in one other point by focusing one line from each of the two established points to the point one wants to find and proceeds in the same manner.

Having thus described my invention, what I claim and desire to secure by Letters Patent in the United States is:

1. A focus drawing scale comprising a base plate having a square aperture in its center, a circular plate secured to said base plate and having an aperture in its center which registers with the aperture in said base plate; a disk the diameter of which is larger than that of said circular plate, coaxially secured to said circular plate so as to form an annular groove with said base plate, and having an aperture registering with the aperture in said circular plate; center strips connecting the center of each two opposite sides of said square apertures to each other and crossing each other in the center point of said disk; a ring engaging the annular groove formed by said base plate, said circular plate and said disk; and a strip secured to the face of said ring and adapted to be moved angularly over said disk when said ring is rotated relative to said disk; said strip being secured to said ring at diametrically opposite points so that its half-way point always coincides with the center point of said disk, and said disk being graduated at its outer circular edge and at the edges of its square aperture.

2. A focus drawing scale comprising a base plate having a centrally situated aperture, a disk secured to said base plate and having an inwardly inclined circular edge and an aperture registering with the aperture in said base plate, an angle meter dial provided on the upper side of said disk adjacent its circular edge, a graduation at the edges of the aperture of said disk, a cross secured to the said aperture and adapted to divide said aperture into four equal squares, a ring having an inwardly inclined inner edge adapted to engage the circular edge of said disk so that said ring can be turned around said disk, and a strip extending across said disk and being secured to said ring at diametrically opposite points so that in all positions of said ring the half way point of said strip coincides with the center of said disk; said ring being provided with windows, adjacent said strips, through which said angle meter dial is visible.

HENRY SCHELLER.